United States Patent [19]

Lorenz

[11] Patent Number: 4,990,079
[45] Date of Patent: Feb. 5, 1991

[54] EXTRUSION SLOT DIE WITH FLEXIBLE LIP

[75] Inventor: Hans Lorenz, Darmstadt, Fed. Rep. of Germany

[73] Assignee: Rohm GMBH Chemische Fabrik, Darmstadt, Fed. Rep. of Germany

[21] Appl. No.: 422,664

[22] Filed: Oct. 17, 1989

[30] Foreign Application Priority Data

Nov. 4, 1988 [DE] Fed. Rep. of Germany ... 8813801[U]

[51] Int. Cl.⁵ .................. B29C 47/16; B29C 47/92
[52] U.S. Cl. ..................... 425/141; 425/381; 425/466
[58] Field of Search .................. 425/141, 381, 466

[56] References Cited

U.S. PATENT DOCUMENTS

| | | | |
|---|---|---|---|
| 3,292,211 | 12/1966 | Strange | 425/135 |
| 3,680,997 | 8/1972 | Dukert et al. | 425/381 |
| 3,706,518 | 12/1972 | Bunte et al. | 425/381 |
| 3,813,204 | 5/1974 | Gregory | 425/466 |
| 3,940,221 | 2/1976 | Nissel | 425/381 X |
| 4,055,389 | 10/1977 | Hayward | 425/381 X |
| 4,470,790 | 9/1984 | Harada et al. | 425/466 X |
| 4,592,710 | 6/1986 | Reifenhauser et al. | 425/141 |
| 4,704,083 | 11/1987 | Iguchi et al. | 425/466 |
| 4,753,587 | 6/1988 | Djordjevic et al. | 425/466 X |
| 4,863,361 | 9/1989 | Boos | 425/141 |

FOREIGN PATENT DOCUMENTS

| | | |
|---|---|---|
| 841536 | 8/1952 | Fed. Rep. of Germany . |
| 1234015 | 2/1967 | Fed. Rep. of Germany . |
| 2305877 | 8/1973 | Fed. Rep. of Germany . |
| 283522 | 12/1986 | Japan ................... 425/466 |

Primary Examiner—Richard L. Chiesa
Attorney, Agent, or Firm—Oblon, Spivak, McClelland, Maier & Neustadt

[57] ABSTRACT

An extrusion die slot for extruding flat thermoplastic webs has a plurality of plates mounted to the flexible lip of the die body. A regulating force from a control element is applied to the plates, and so to the flexible lip, via the flexible strip pressed between the control element and the plates.

15 Claims, 3 Drawing Sheets

EXTRUSION SLOT DIE WITH FLEXIBLE LIP

BACKGROUND OF THE INVENTION

1. Field of the Invention

The invention relates to an extrusion slot die with a flexible lip and a multiplicity of control elements that act on the lip to regulate the slot width so as to extrude flat webs, in particular sheets, of thermoplastics.

2. Description of the Related Art

Extrusion slot dies (100) with flexible lips have, as seen in FIG. 2, a relatively long lip section (102) which, as a result of its small thickness, is elastic and makes possible a change in the slot width by control elements (104) that act on the lip. In the front part (106) of the lip, where the control elements (104) act, the lip must be thickened to support forces from the control elements. In practice, the thickness of the lip in this area is always more than 20 mm, thus considerably limiting its flexibility.

Because the lip is very thick at its tip section in the known extrusion slot dies, the possibilities for precise control of the lip width are limited. For example, due to the melt elasticity, the web leaving the die has a tendency to contract in width while becoming thicker, which can be countered only by reducing the slot width at the sides of the slot. Such fine control is difficult in the prior art.

Also, on every other point of the die local thickness fluctuations of the extruded web can occur due, for example, to inaccuracies in the temperature control that must be compensated for by a countercontrol of the slot width. The rigidity of the front lip area places limits on this precision control.

SUMMARY OF THE INVENTION

An object of the invention is an improvement of the controllability of the slot height.

The above, and other, objects are achieved according to the present invention by an extrusion slot die for extruding flat thermoplastic webs, comprising a die body having a flexible lip forming a portion of a slot through which the web is extruded, a plurality of plates having bottom surfaces mounted to the lip and mutually spaced in a thickness direction parallel to the plane of the web and transverse to the direction of extrusion of the web, at least one control element adjustably mounted relatively to the die body, and a flexible strip pressed between the at least one control element and the plates. A regulating force from the control element is applied to the lip via the flexible strip and the plates.

BRIEF DESCRIPTION OF THE DRAWINGS

A more complete appreciation of the invention and many of the attendant advantages thereof will be readily obtained as the same becomes better understood when considered in connection with the accompanying drawings, wherein.

DETAILED DESCRIPTION OF THE PREFERRED EMBODIMENTS

Figure 1:
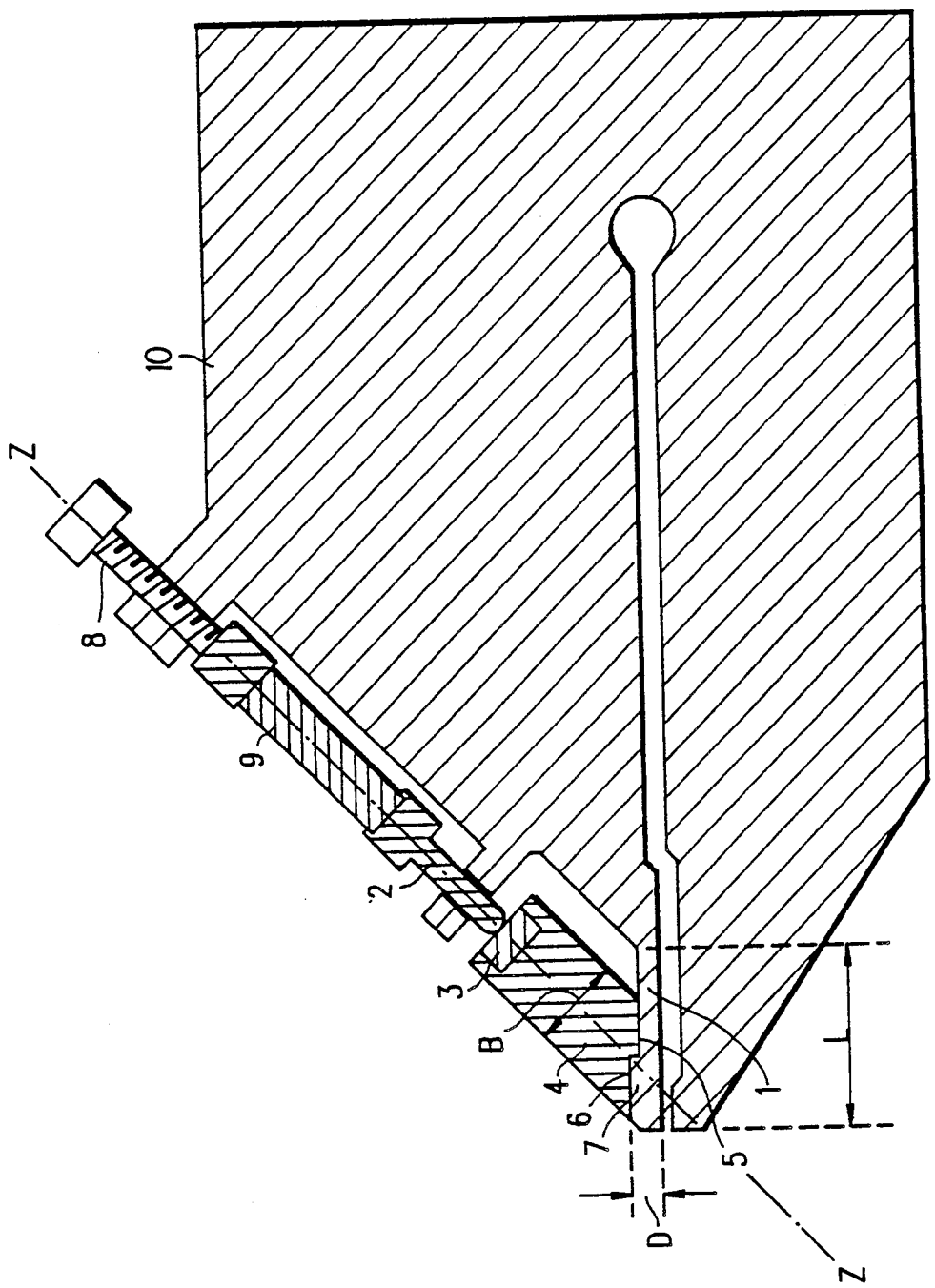
FIG. 1 is a lengthwise section through the extrusion slot die of the invention.
Figure 2:
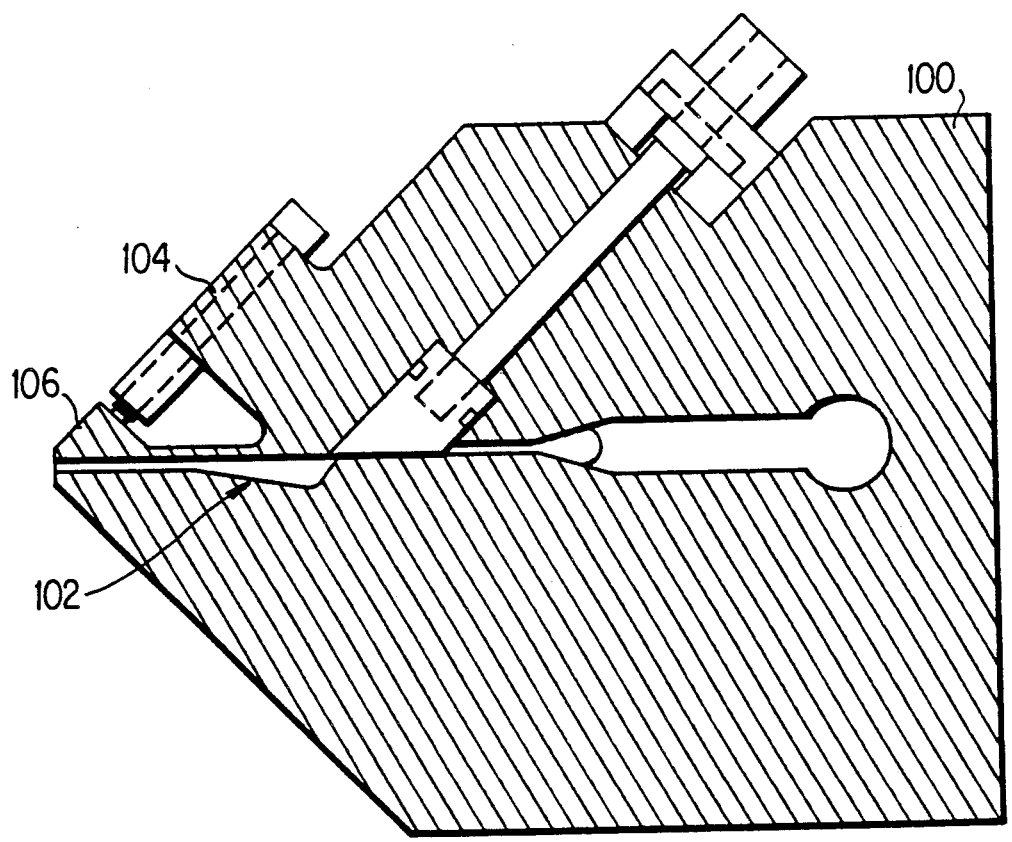
FIG. 2 shows, for comparison, a lengthwise section through a known configuration of an extrusion slot die with a flexible lip.
Figure 3:
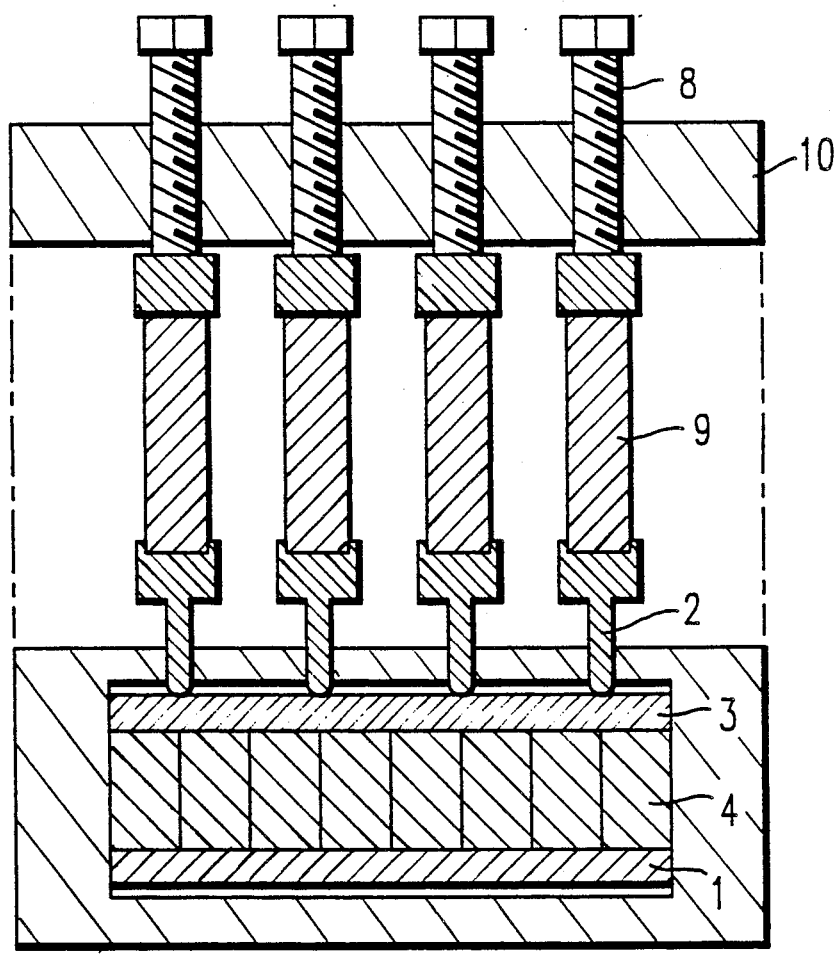
FIG. 3 is a cross section along line Z—Z of FIG. 1.

According to the invention, control elements (2) adjustably mounted to the die body (10) apply regulating forces to a flexible strip (3), the forces being transmitted from the latter via plates (4) to a flexible lip (1). Plates (4) can move relative to each other in the direction of the regulating force and have bottom surfaces in nonpositive (i.e., non-fixed) engagement with flexible lip (1).

Flexible strip (3) distributes the regulating force from one or more control elements (2) to several plates (4), the regulating force, as a result of the elasticity of the strip, decreasing with increasing lateral distance from the point of application. The plates (4) in turn transmit the regulating force emanating from the control elements (2) to a larger section of the lip. This is true in both the lengthwise direction as well as in the crosswise direction of the lip. The more uniform distribution of the regulating force makes it possible to configure the lip over its entire length L to be flexible so that it can be precisely controlled within relatively narrowly limited ranges.

Strip (3) preferably consists of a flat strip of steel and has sufficient elasticity that it transmits the regulating force of a single control element to several plates 4, although each plate 4 can have its own control element. For plural control elements mutually spaced by distances of 10 to 40 mm, for example, a steel strip 3 less than 20 mm thick, e.g., 0.5 to 10 mm and preferably 0.5 to 5 mm thick, and 6 to 30 mm wide is suitable. Preferably a strip 3 that is continuous over the entire width of the die is used.

The elasticity of strip (3) should correspond with that of lip (1) in a suitable way to make possible the necessary precision control. It is advantageous if flexible lip (1) has, over its entire length L, a maximum thickness D of less than 20 mm, e.g., 3 to 10 mm.

For the introduction of the regulating force as uniformly as possible on the lip, the configuration of plates (4) is of considerable importance. As a rule, the regulating force acts at an acute angle on lip (1). Therefore, bottom i.e., contact surface (5) surfaces of the plates (4) are also at an angle to strip (3). The nonpositive connection between the plates and the lip is achieved by a step (6) forming a ridge on the outer side of the lip and a mating step (7) forming a groove in bottom surface (5) of each of the plates, so that the plates can press on the lip without slipping.

The dimensions of the plates are designated as height, width and thickness. The height is the dimension in the direction of the regulating force; it is not critical as long as it is sufficient that the plate can transmit the regulating force without deformation. Width B is preferably large enough so that bottom surfaces (5) of the plates cover more than half of length L of lip (1). The thickness of plates (4) is their extension in the plane of web crosswise to the extrusion direction. The maximum thickness of each plate corresponds to the width of the areas for which a precision control is desired. As a rule, the thickness of a plate is less than the length of bottom surface (5) acting on the lip and less than width B. Preferably, the number of plates (4) is larger than the number of control elements (2) and at least some of plates (4) are narrower than the spacing of control elements (2). A plate thickness less than 10 mm is advantageous. They can be made, for example, of sheet steel 1 to 5 mm thick.

It is preferred, but not essential, that the control elements (2) extend over the entire width of the die with spacing at uniform distances, for example 10 to 40 mm, and that all plates (4) have the same thickness. If a precision control of the slot width is sought mainly at the ends of the die in the thickness direction, the control elements should there be placed as close as possible, and their regulating force should be transmitted by a large number of plates to the corresponding lip section, which number is larger than the number of control elements at the ends of the die.

For adjustment of control elements (2), there may be used standard screw bolts that can be adjusted, for example, by their hexagonal heads via a wrench. Thermal expansion bolts or piezotranslators may also be used. In the embodiment according to FIG. 1, a screw bolt (8) is used for rough adjustment, while the precision adjustment is made by thermal expansion bolt (9). By use of electrical heating (not shown) that can be regulated, the expansion bolt is adjusted by thermal expansion to the required length. The bolt heating can be regulated automatically by a control means in response to a thickness measurement of the generated web.

Naturally, the invention has great significance for extrusion units for producing webs of thermoplastics with especially great demands as to the thickness tolerance. Although irregularities of certain extruded webs can be eliminated in some cases by a calendar downstream from the extrusion, for thin webs, because of their rapid cooling to below the softening temperature, it is difficult to achieve a thickness correction in this way. Therefore the invention is preferably used with extrusion dies with a slot height less than 5 mm, in particular flat film dies with slot widths of 0.2 to 1 mm. Thermoplastics that can be extruded advantageously with the dies according to the invention include, e.g., polymethacrylate, polycarbonates, polyesters, polysulfones and polyethersulfones.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. An extrusion slot die for extruding flat thermoplastic webs, comprising:
   a die body having a flexible lip forming a portion of a slot through which the web is extruded;
   a plurality of plates having bottom surfaces mounted to said lip and mutually spaced in a thickness direction parallel to a plane of the web and transverse to a direction of extrusion of the web;
   at least one control element adjustably mounted relative to said die body; and
   a flexible strip pressed between said at least one control element and said plates,
   whereby a regulating force from said at least one control element is applied to said lip via said flexible strip and said plates.

2. The extrusion slot die of claim 1 wherein said bottom surfaces of said plates non-fixedly engage said lip and extend on said lip more than one half of a length of said lip in the extrusion direction.

3. The extrusion slot die of claim 2, wherein a thickness of at least some of said plates in the thickness direction is less than a width of said plates in a width direction transverse to said thickness direction and to a direction of application of the regulating force.

4. The extrusion slot die of claim 2, including steps in the bottom surfaces of said plates mating with a step on said lip for non-fixedly mounting said plates to said lip.

5. The extrusion slot die of claim 1, including a plural number of said control elements, which is smaller than a number of said plates.

6. The extrusion slot die of claim 5, wherein at least some of said plates are thinner in the thickness direction than a spacing of said control element.

7. The extrusion slot die of claim 1, wherein a maximum height of said lip in a direction transverse to a plane of the web is less than 15 mm.

8. The extrusion slot die of claim 1, wherein a maximum height of said lip in a direction transverse to a plane of the web is less than 10 mm.

9. The extrusion slot die of claim 1, wherein said flexible strip has a height in the direction of application of the regulating force of between 0.5 mm and 20 mm.

10. The extrusion slot die of claim 1, wherein said flexible strip has a height in the direction of application of the regulating force of between 0.5 mm and 10 mm.

11. The extrusion slot die of claim 1, wherein said slot has a height in a direction transverse to a plane of the web which is less than 5 mm.

12. The extrusion slot die of said claim 1, wherein the regulating force is applied in a direction oblique to the plane of said web.

13. The extrusion slot die of claim 12, including adjustment means for adjusting said at least one control element.

14. The extrusion slot die of claim 13, wherein said adjustment means comprises screw threading holding said control element in said die body.

15. The extrusion slot die of claim 14, including a piezotranslators or thermal expansion bolt connecting said control element with said screw threading for precision adjustment of said control elements.

* * * * *